(12) United States Patent
Matsukane et al.

(10) Patent No.: US 10,360,784 B2
(45) Date of Patent: Jul. 23, 2019

(54) ENCODER SYSTEM HAVING FUNCTION OF DETECTING ABNORMALITY, AND METHOD FOR DETECTING ABNORMALITY OF THE SAME

(71) Applicant: Fanuc Corporation, Yamanashi (JP)

(72) Inventors: Tokuhisa Matsukane, Yamanashi (JP); Keisuke Imai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/981,198

(22) Filed: May 16, 2018

(65) Prior Publication Data
US 2018/0342145 A1 Nov. 29, 2018

(30) Foreign Application Priority Data
May 29, 2017 (JP) ................................ 2017-105696

(51) Int. Cl.
| | |
|---|---|
| G01D 5/12 | (2006.01) |
| G01D 5/244 | (2006.01) |
| G01D 5/347 | (2006.01) |
| G08B 21/18 | (2006.01) |
| H04L 12/26 | (2006.01) |

(52) U.S. Cl.
CPC ....... G08B 21/185 (2013.01); G01D 5/24461 (2013.01); H04L 43/08 (2013.01); G01D 5/12 (2013.01); G01D 5/3473 (2013.01)

(58) Field of Classification Search
CPC ........ H02K 29/08; H02K 7/116; H02P 21/14; H02P 25/08; H02P 6/16; H02P 8/42
USPC .......................................... 340/648; 318/490
See application file for complete search history.

(56) References Cited

U.S. PATENT DOCUMENTS

| | | | | |
|---|---|---|---|---|
| 4,977,359 A | * | 12/1990 | Sawai | ..................... H02P 23/16 318/561 |
| 7,659,714 B2 | | 2/2010 | Hayashi et al. | |
| 8,344,678 B2 | * | 1/2013 | Koshobu | ................ G05B 19/19 318/268 |
| 8,823,576 B2 | | 9/2014 | Taniguchi et al. | |
| 9,287,756 B2 | | 3/2016 | Kibe et al. | |
| 10,072,948 B2 | | 9/2018 | Ogawa et al. | |

(Continued)

FOREIGN PATENT DOCUMENTS

| | | |
|---|---|---|
| JP | H03100411 A | 4/1991 |
| JP | H04062420 A | 2/1992 |

(Continued)

Primary Examiner — Emily C Terrell
(74) Attorney, Agent, or Firm — RatnerPrestia (57) ABSTRACT

An encoder system includes an encoder for outputting positional data and magnetic pole data of an output axis of a motor; and a controller for communicating with the encoder. The encoder includes a positional data generation circuit; a magnetic pole data generation circuit; a first data abnormality detection circuit for detecting an abnormality based on the positional data and the magnetic pole data, and outputting a first alarm signal; and a parallel-to-serial conversion circuit for outputting the positional data, the magnetic pole data, and the first alarm signal to the controller. The controller includes a second data abnormality detection circuit for detecting an abnormality based on the positional data and the magnetic pole data, and outputting a second alarm signal; and a communication abnormality detector for detecting an abnormality in a communication path based on the first and second alarm signals.

13 Claims, 6 Drawing Sheets

(56) References Cited

U.S. PATENT DOCUMENTS

| | | | |
|---|---|---|---|
| 2004/0066165 A1* | 4/2004 | Kamio | H02P 6/16 318/701 |
| 2007/0229018 A1* | 10/2007 | Mitchell | G01R 31/343 318/650 |
| 2013/0234635 A1* | 9/2013 | Kojima | H02P 6/12 318/400.21 |
| 2013/0241570 A1* | 9/2013 | Okamoto | G01R 31/2841 324/537 |
| 2015/0123589 A1* | 5/2015 | Matsutani | G05B 23/0224 318/652 |

FOREIGN PATENT DOCUMENTS

| | | |
|---|---|---|
| JP | H04305118 A | 10/1992 |
| JP | H05-344775 A | 12/1993 |
| JP | 06223293 | 8/1994 |
| JP | H08054254 A | 2/1996 |
| JP | 09049741 | 2/1997 |
| JP | 10285981 | 10/1998 |
| JP | 11337372 | 12/1999 |
| JP | 2000081910 A | 3/2000 |
| JP | 2005091270 | 4/2005 |
| JP | 2005237093 | 9/2005 |
| JP | 2007017385 | 1/2007 |
| JP | 2007147465 | 6/2007 |
| JP | 2008092620 A | 4/2008 |
| JP | 2008232648 A | 10/2008 |
| JP | 2011-192015 A | 9/2011 |
| JP | 2014170328 | 9/2014 |
| JP | 2015031545 A | 2/2015 |
| JP | 2016218867 A | 12/2016 |

* cited by examiner

ENCODER SYSTEM HAVING FUNCTION OF DETECTING ABNORMALITY, AND METHOD FOR DETECTING ABNORMALITY OF THE SAME

This application is a new U.S. patent application that claims benefit of JP 2017-105696 filed on May 29, 2017, the content of 2017-105696 is incorporated herein by reference.

BACKGROUND OF THE INVENTION

1. Field of the Invention

The present invention relates to an encoder system having a function of detecting an abnormality, and a method for detecting an abnormality of the same.

2. Description of Related Art

Encoders are used for measuring the angles of output axes of motors or tables. When the encoders output abnormal positional data, the motors or tables get out of control. Thus, it is necessary for controllers that control the motors or tables to detect the presence or absence of an abnormality in the encoders.

A method for monitoring the normal control of a servomotor by performing a comparison between a parameter (speed range, position range, etc.) set in a safety unit and the feedback from an encoder has been reported (for example, Japanese Unexamined Patent Publication (Kokai) No. 2011-192015).

A method in which, by performing a comparison between an encoder signal and a rotational direction signal thereof, and the signal of a position detection device and a rotational direction signal thereof, a state in which criteria specified between the signals are not satisfied is detected, in order to issue a signal to stop energization of an energization control device has also been reported (for example, Japanese Unexamined Patent Publication (Kokai) No. H05-344775).

SUMMARY OF THE INVENTION

However, in these methods, the relationship between an abnormality detected in the encoder and an abnormality detected by the controller is unclear. Thus, there is a problem that it is difficult to recognize whether a cause of the occurrence of an abnormality is present in the encoder or in a communication path between the encoder and the controller.

An encoder system according to an embodiment of this disclosure includes an encoder configured to output positional data and magnetic pole data of an output axis of a motor; and a controller wiredly or wirelessly communicating with the encoder, configured to receive the positional data and the magnetic pole data outputted from the encoder. The encoder includes a positional data generation circuit configured to measure an angle of the output axis of the motor, and generating the positional data from the measured angle; a magnetic pole data generation circuit configured to generate the magnetic pole data representing the position of a rotor of the motor; a first data abnormality detection circuit configured to detect the presence or absence of an abnormality based on the positional data and the magnetic pole data, and output a first alarm signal indicating whether or not an abnormality has occurred; and a parallel-to-serial conversion circuit configured to apply parallel-to-serial conversion to the positional data, the magnetic pole data, and the first alarm signal, and output serial data to the controller. The controller includes a second data abnormality detection circuit configured to detect the presence or absence of an abnormality based on the positional data and the magnetic pole data received from the encoder, and output a second alarm signal indicating whether or not an abnormality has occurred; and a communication abnormality detector configured to detect the presence or absence of an abnormality in a communication path between the encoder and the controller, based on the first alarm signal and the second alarm signal.

A method for detecting an abnormality according to an embodiment of this disclosure is a method for detecting an abnormality using a system that includes an encoder configured to output positional data and magnetic pole data of an output axis of a motor; and a controller wiredly or wirelessly communicating with the encoder, configured to receive the positional data and the magnetic pole data outputted from the encoder. The encoder measures an angle of the output axis of the motor, and generates the positional data from the measured angle; generates the magnetic pole data representing the position of a rotor of the motor; detects the presence or absence of an abnormality based on the positional data and the magnetic pole data, and outputs a first alarm signal indicating whether or not an abnormality has occurred; and applies parallel-to-serial conversion to the positional data, the magnetic pole data, and the first alarm signal, and outputs serial data to the controller. The controller detects the presence or absence of an abnormality based on the positional data and the magnetic pole data received from the encoder, and outputs a second alarm signal indicating whether or not an abnormality has occurred; and detects the presence or absence of an abnormality in a communication path between the encoder and the controller, based on the first alarm signal and the second alarm signal.

BRIEF DESCRIPTION OF THE DRAWINGS

The objects, features, and advantages of the present invention will be more apparent from the following description of a preferred embodiment relating to the accompanying drawings. In the drawings.

DETAILED DESCRIPTION OF THE INVENTION

An encoder system having the function of detecting an abnormality and a method for detecting an abnormality according to the present invention will be described below with reference to the drawings. However, the technical scope of the present invention is not limited to this embodiment, but encompasses the invention described in claims and equivalents thereof.

Figure 1:
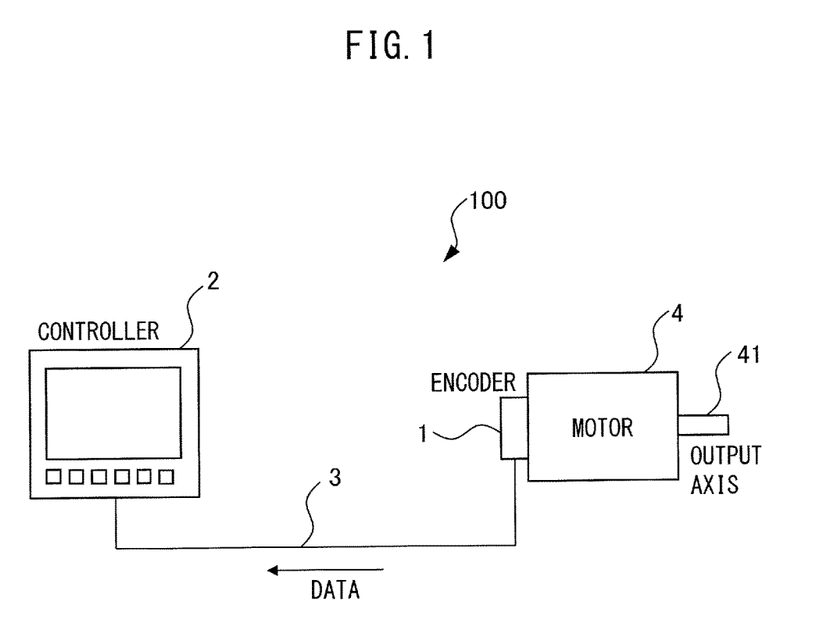
FIG. 1 is a block diagram showing the configuration of an encoder system according to an embodiment.

FIG. 1 shows the configuration of an encoder system according to an embodiment. An encoder system 100 includes an encoder 1 configured to output positional data and magnetic pole data of an output axis 41 of a motor 4, and a controller 2 that wiredly or wirelessly communicates with the encoder 1 and receives the positional data and the magnetic pole data outputted from the encoder 1. FIG. 1 shows an example in which the encoder 1 and the controller 2 performs wired communication through wiring 3. However, the encoder 1 and the controller 2 may each have transceivers and may perform wireless communication.

Figure 2:
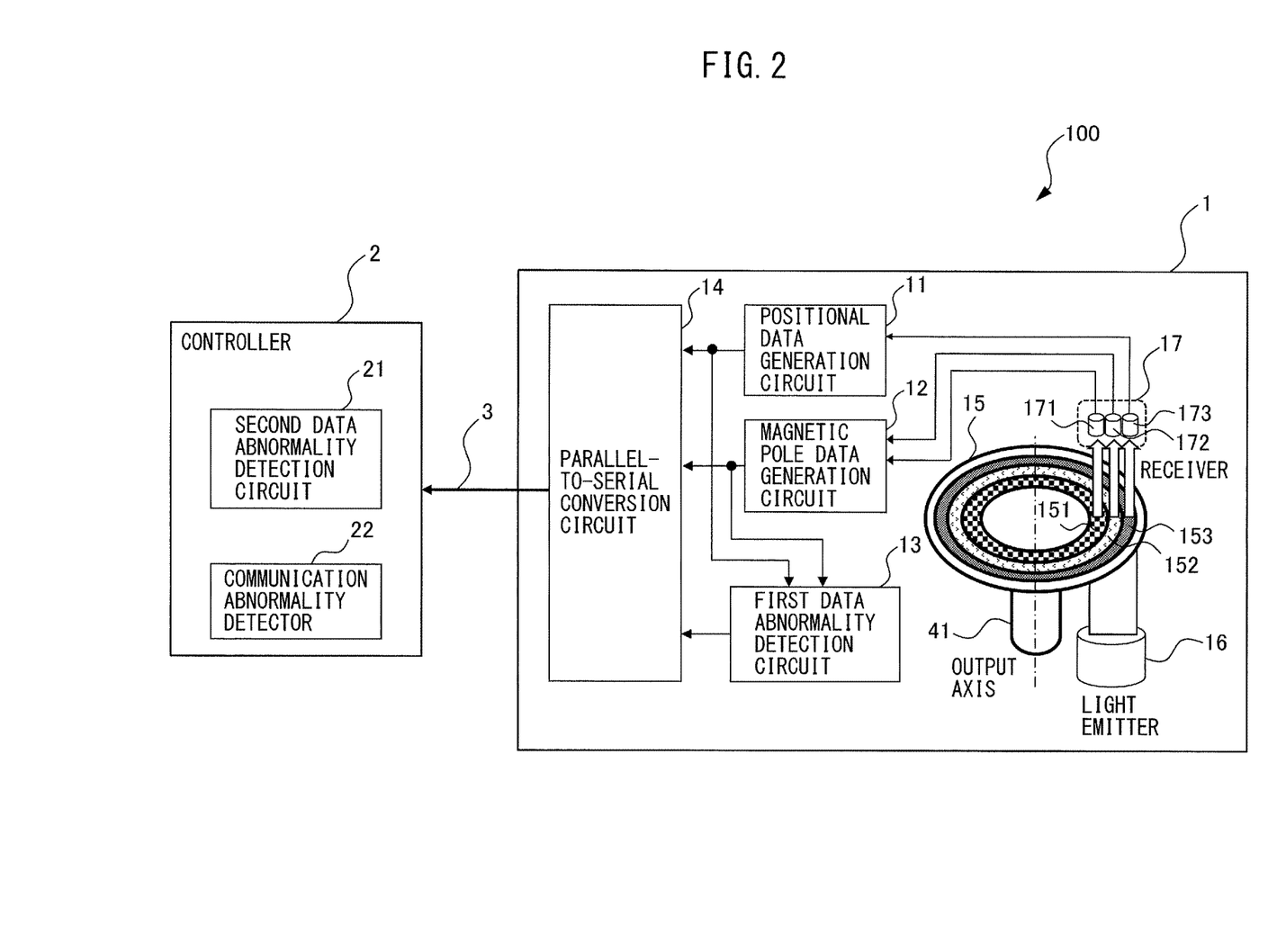
FIG. 2 is a block diagram showing the detailed configuration of the encoder system according to the embodiment.

FIG. 2 shows the detailed configuration of the encoder system according to the embodiment. The encoder 1 has a positional data generation circuit 11, a magnetic pole data generation circuit 12, a first data abnormality detection circuit 13, and a parallel-to-serial conversion circuit 14.

The positional data generation circuit 11 measures the angle of the output axis 41 of the motor 4, and generates positional data from the measured angle. The magnetic pole data generation circuit 12 generates magnetic pole data that represents the position of a rotor (not shown) of the motor 4.

The output axis 41 of the motor 4 is provided with a rotator 15, which rotates about the output axis 41. The rotator 15 includes tracks 151 to 153 to detect the rotation angle of the output axis 41. Track 151 is an A-phase track. Track 152 is a B-phase track. Track 153 is a Z-phase track. In the A-phase track 151 and the B-phase track 152, radial slits of an A-phase pattern and radial slits of a B-phase pattern are continuously formed at a constant pitch so as to be spatially 90 degrees out of phase, as detection patterns. In the Z-phase track 153, slits of a Z-phase pattern are formed at inconstant pitches.

A light emitter 16 including an LED, etc. is provided beneath the rotator 15. The light emitter 16 emits light towards the rotator 15.

A receiver 17 is disposed so as to correspond to tracks 151 to 153. The receiver 17 has detection elements 171 to 173 each of which is constituted of a light receiving element, such as a phototransistor or a photodiode. The detection element 173 is a Z-phase detection element, which detects light that has passed through the slits of the Z-phase track 153, from among the light emitted from the light emitter 16. A Z-phase signal having information about the detected light is outputted to the positional data generation circuit 11. The detection element 171 is an A-phase detection element, which detects light that has passed through the slits of the A-phase track 151, from among the light emitted from the light emitter 16. An A-phase signal having information about the detected light is outputted to the magnetic pole data generation circuit 12. The detection element 172 is a B-phase detection element, which detects light that has passed through the slits of the B-phase track 152, from among the light emitted from the light emitter 16. A B-phase signal having information about the detected light is outputted to the magnetic pole data generation circuit 12.

The positional data generation circuit 11 calculates positional data of the output axis 41 based on the signal generated by the receiver 17. The magnetic pole data generation circuit 12 calculates magnetic pole data of the output axis 41 based on the signals generated by the receiver 17.

Figure 3A:
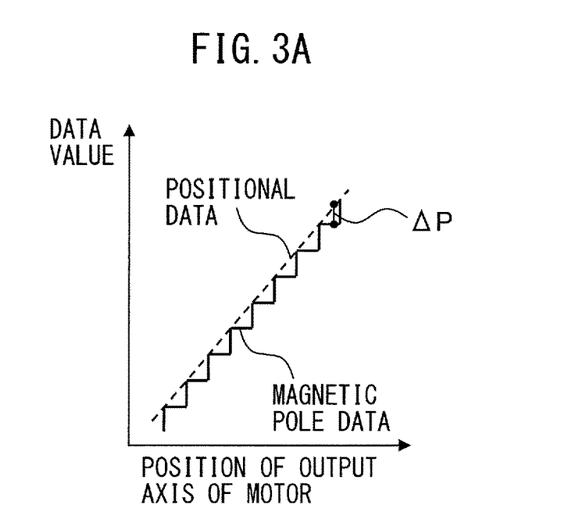
FIG. 3A is a graph of positional data and magnetic pole data to be used for determining the presence or absence of an abnormality by an encoder, when both of the positional data and the magnetic pole data are normal.

The first data abnormality detection circuit 13 detects the presence or absence of an abnormality based on positional data and magnetic pole data, and outputs a first alarm signal indicating whether or not an abnormality has occurred. FIG. 3A shows examples of positional data and magnetic pole data to be used for determining the presence or absence of an abnormality by the encoder, when both of the positional data and the magnetic pole data are normal. In FIG. 3A, the horizontal axis represents the position of the output axis of the motor, and the vertical axis represents the data values of the positional data and the magnetic pole data. The positional data is indicated by the broken line, and the magnetic pole data is indicated by the solid line. The first data abnormality detection circuit 13 determines that an abnormality has occurred, when the difference $\Delta P$ between the positional data and the magnetic pole data exceeds a threshold value.

Figure 4A:
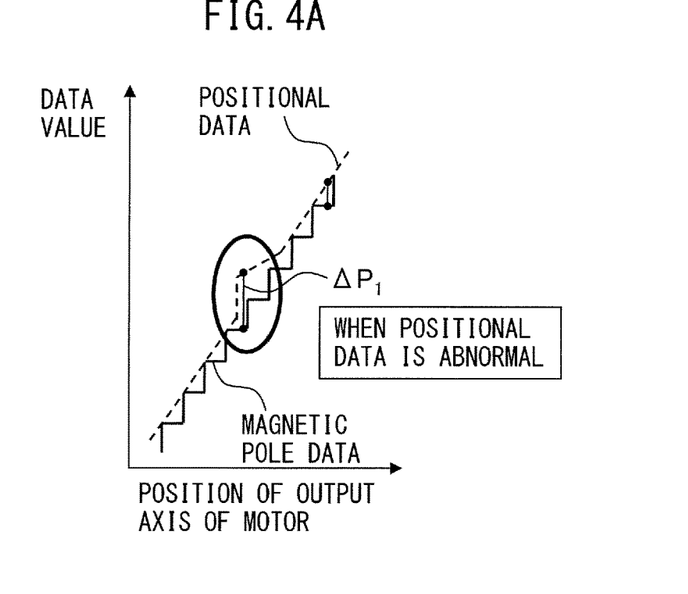
FIG. 4A is a graph of positional data and magnetic pole data to be used for determining the presence or absence of an abnormality by the encoder or the controller, when the positional data is abnormal.

FIG. 4A shows examples of positional data and magnetic pole data to be used for determining the presence or absence of an abnormality by the encoder, when the positional data is abnormal. As enclosed by the circle in FIG. 4A, when the positional data indicated by the broken line becomes abnormal, and the difference $\Delta P$ between the positional data and the magnetic pole data becomes a value $\Delta P_1$ higher than the threshold value, it is determined that an abnormality has occurred. More specifically, the first data abnormality detection circuit 13 outputs "1" to the parallel-to-serial conversion circuit 14 as a first alarm signal (alarm bit) when the difference $\Delta P_1$ between the positional data and the magnetic pole data exceeds the threshold value. On the other hand, when the difference $\Delta P_1$ between the positional data and the magnetic pole data is equal to or lower than the threshold value, the first data abnormality detection circuit 13 determines that no abnormality (a normal state) has occurred, and outputs "0" to the parallel-to-serial conversion circuit 14, as the first alarm signal.

Figure 4B:
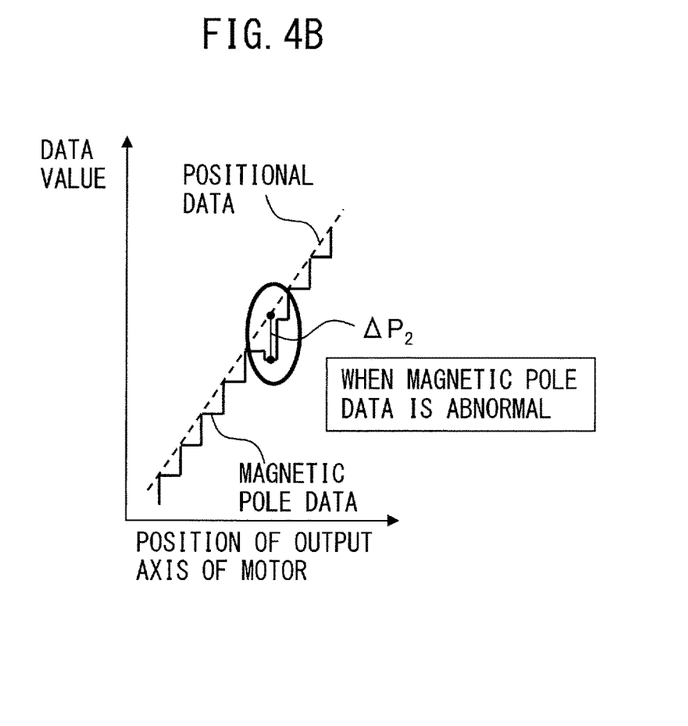
FIG. 4B is a graph of positional data and magnetic pole data to be used for determining the presence or absence of an abnormality by the encoder or the controller, when the magnetic pole data is abnormal.

FIG. 4B shows examples of positional data and magnetic pole data to be used for determining the presence or absence of an abnormality by the encoder, when the magnetic pole data is abnormal. As enclosed by the circle in FIG. 4B, when the magnetic pole data indicated by a solid line becomes abnormal, and the difference $\Delta P$ between the positional data and the magnetic pole data becomes a value $\Delta P_2$ higher than a threshold value, it is determined that an abnormality has occurred. More specifically, the first data abnormality detection circuit 13 outputs "1" to the parallel-to-serial conversion circuit 14 as a first alarm signal (alarm bit), when the difference $\Delta P$ between the positional data and the magnetic pole data exceeds the threshold value. On the other hand, when the difference $\Delta P$ between the positional data and the magnetic pole data is equal to or lower than the threshold value, the first data abnormality detection circuit 13 determines that no abnormality (a normal state) has occurred, and outputs "0" to the parallel-to-serial conversion circuit 14, as the first alarm signal (alarm bit).

Figure 5A:
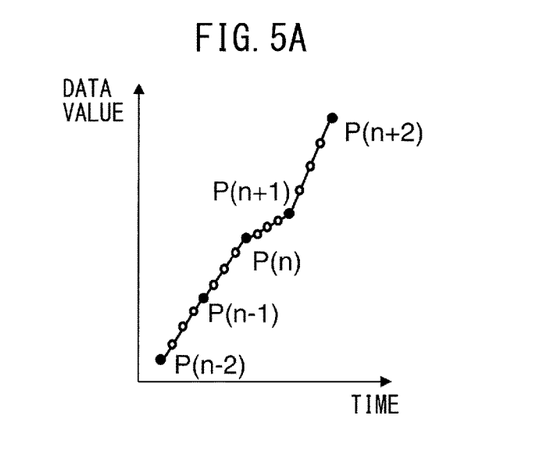
FIG. 5A is a graph showing an example of positional data to calculate velocity data to be used for determining the presence or absence of an abnormality by the encoder.

In the above description, the presence or absence of an abnormality is detected based on the difference between the positional data and the magnetic pole data. However, the presence or absence of an abnormality may be detected based on velocity data calculated from the positional data. FIG. 5A shows an example of positional data to calculate velocity data to be used for determining the presence or absence of an abnormality by the encoder. As shown in FIG. 5A, the first data abnormality detection circuit 13 may output a first alarm signal when the velocity data V(n) calculated from the positional data P(n) detected at a reference time (hereinafter referred to as "present time") and positional data P(n−1) detected a predetermined time before the reference time (hereinafter referred to as "previous time") exceeds a threshold velocity.

Alternatively, the first data abnormality detection circuit 13 may output a first alarm signal when the difference between the velocity data V(n) at the present time calculated from positional data P(n) detected at the present time and positional data P(n−1) detected at the previous time and the velocity data V(n−1) at the previous time calculated from the positional data P(n−1) detected at the previous time and positional data P(n−2) detected a further predetermined time before the previous time (hereinafter referred to as "second previous time") exceeds a threshold velocity. Detecting the presence or absence of an abnormality based on the velocity data, as described above, can determine the presence or absence of an abnormality from the positional data, without using magnetic pole data.

Figure 6:
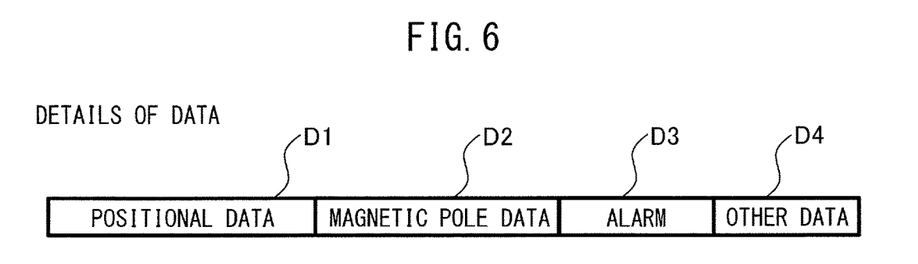
FIG. 6 is a drawing showing the configuration of data to be sent from the encoder to the controller.

The parallel-to-serial conversion circuit 14 applies parallel-to-serial conversion to the positional data, magnetic pole data, and the first alarm signal, and outputs serial data to the controller 2. FIG. 6 shows the configuration of the data to be sent from the encoder to the controller. The data includes positional data D1, magnetic pole data D2, an alarm signal D3, and other data D4. An alarm bit of "1" or "0", which is the first alarm signal, is included in the alarm signal D3.

The controller 2 has a second data abnormality detection circuit 21, and a communication abnormality detector 22.

The second data abnormality detection circuit 21 detects the presence or absence of an abnormality based on positional data and magnetic pole data received from the encoder 1, and outputs a second alarm signal indicating whether or not an abnormality has occurred. The second data abnormality detection circuit 21 of the controller 2 preferably detects the presence or absence of an abnormality using the same positional data and magnetic pole data as used by the first data abnormality detection circuit 13 of the encoder 1 to determine the presence or absence of an abnormality.

Figure 3B:
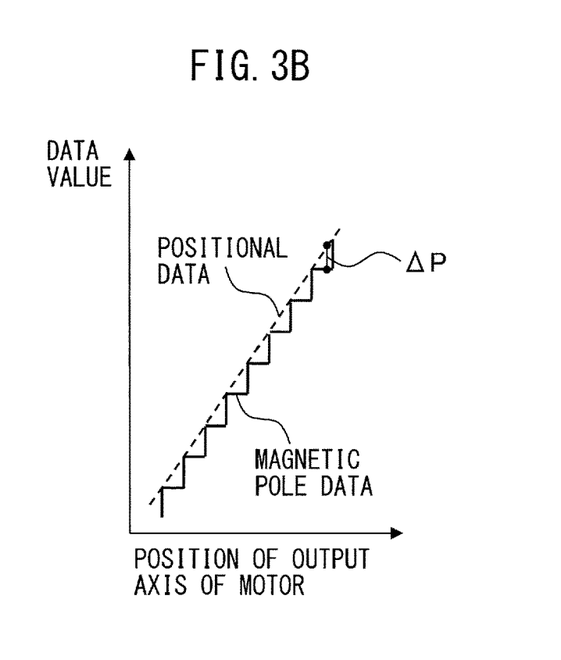
FIG. 3B is a graph of positional data and magnetic pole data to be used for determining the presence or absence of an abnormality by a controller, when both of the positional data and the magnetic pole data are normal.

FIG. 3B shows examples of the positional data and magnetic pole data to be used for determining the presence or absence of an abnormality by the controller, when both of the positional data and the magnetic pole data are normal. In FIG. 3B, the horizontal axis represents the position of the output axis of the motor, and the vertical axis represents the data values of the positional data and the magnetic pole data. The positional data is indicated by the broken line, and the magnetic pole data is indicated by the solid line. The second data abnormality detection circuit 21 outputs a second alarm signal when the difference ΔP between the positional data and the magnetic pole data exceeds a threshold value.

FIG. 4A shows examples of positional data and magnetic pole data to be used for determining the presence or absence of an abnormality by the controller, when the positional data is abnormal. As enclosed by the circle in FIG. 4A, when the positional data indicated by the broken line becomes abnormal, and the difference ΔP between the positional data and the magnetic pole data becomes a value $\Delta P_1$ higher than a threshold value, it is determined that an abnormality has occurred. More specifically, when the difference ΔP between the positional data and the magnetic pole data exceeds the threshold value, the second data abnormality detection circuit 21 determines that an abnormality has occurred, and outputs "1" to the communication abnormality detector 22, as a second alarm signal. On the other hand, when the difference ΔP between the positional data and the magnetic pole data is equal to or lower than the threshold value, the second data abnormality detection circuit 21 determines that no abnormality (a normal state) has occurred, and outputs "0" to the communication abnormality detector 22, as the second alarm signal.

FIG. 4B shows examples of positional data and magnetic pole data to be used for determining the presence or absence of an abnormality by the controller, when the magnetic pole data is abnormal. As enclosed by the circle in FIG. 4B, when the magnetic pole data indicated by the solid line becomes abnormal, and the difference ΔP between the positional data and the magnetic pole data becomes a value $\Delta P_2$ higher than a threshold value, it is determined that an abnormality has occurred. More specifically, when the difference ΔP between the positional data and the magnetic pole data exceeds the threshold value, the second data abnormality detection circuit 21 determines that an abnormality has occurred, and outputs "1" to the communication abnormality detector 22, as a second alarm signal. On the other hand, when the difference ΔP between the positional data and the magnetic pole data is equal to or lower than the threshold value, the second data abnormality detection circuit 21 determines that no abnormality (a normal state) has occurred, and outputs "0" to the communication abnormality detector 22, as the second alarm signal.

Figure 5B:
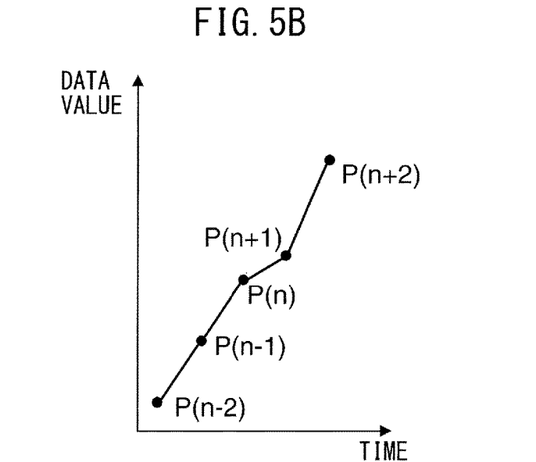
FIG. 5B is a graph showing an example of positional data to calculate velocity data to be used for determining the presence or absence of an abnormality by the controller.

In the above description, the presence or absence of an abnormality is detected based on the difference between the positional data and the magnetic pole data. However, the presence or absence of an abnormality may be detected based on velocity data calculated from the positional data. FIG. 5B shows an example of positional data to calculate the velocity data to be used for determining the presence or absence of an abnormality by the controller. As shown in FIG. 5B, the second data abnormality detection circuit 21 may output a second alarm signal when the velocity data V(n) calculated from positional data P(n) detected at the present time and positional data P(n−1) detected at the previous time exceeds a threshold velocity.

Alternatively, the second data abnormality detection circuit 21 may output a second alarm signal when the difference between the velocity data V(n) at the present time calculated from positional data P(n) detected at the present time and positional data P(n−1) detected at the previous time and the velocity data V(n−1) at the previous time calculated from the positional data P(n−1) detected at the previous time and positional data P(n−2) detected at the second previous time exceeds a threshold velocity.

The communication abnormality detector 22 detects the presence or absence of an abnormality in the wiring 3, which is a communication path between the encoder 1 and the controller 2, based on the first alarm signal and the second alarm signal. When either the first alarm signal or the second alarm signal indicates an abnormality, the communication abnormality detector 22 determines that an abnormality has occurred in the wiring 3, i.e., the communication path. This is because when the wiring 3, i.e., the communication path, is normal, if the first alarm signal is abnormal ("1"), the second alarm signal also becomes abnormal ("1"). On the contrary, if the first alarm signal is normal ("0"), the second alarm signal also becomes normal ("0").

On the other hand, when both of the first alarm signal and the second alarm signal indicate abnormalities, the communication abnormality detector 22 determines that an abnormality has occurred in the encoder 1. When the encoder 1 is abnormal, the first alarm signal indicates an abnormality. Since the controller 2 detects the presence or absence of an abnormality using the same positional data and magnetic pole data as used by the encoder 1, when the second alarm signal also indicates an abnormality, the wiring 3, i.e., the communication path, is determined to be normal, and the encoder 1 is determined to be abnormal.

In the above description, the first data abnormality detection circuit 13 of the encoder 1 and the second data abnormality detection circuit 21 of the controller 2 preferably detect an abnormality in the same manner. In other words, the first data abnormality detection circuit 13 and the second data abnormality detection circuit 21 preferably detect the presence or absence of an abnormality using the same positional data and magnetic pole data by the same abnormality detection method. When an abnormality is detected from the positional data and the magnetic pole data, it is thereby possible to easily recognize whether the cause of the abnormality is present in the encoder or in the communication path between the encoder and the controller.

Furthermore, the first data abnormality detection circuit 13 and the second data abnormality detection circuit 21 preferably calculate the difference between the positional data and the magnetic pole data in the same cycles, and use the same threshold value as a criterion for determining the presence or absence of alarms. When an abnormality is detected from the positional data and the magnetic pole data, it is thereby possible to further easily recognize whether the cause of the abnormality is present in the encoder or in the communication path between the encoder and the controller.

Figure 7:
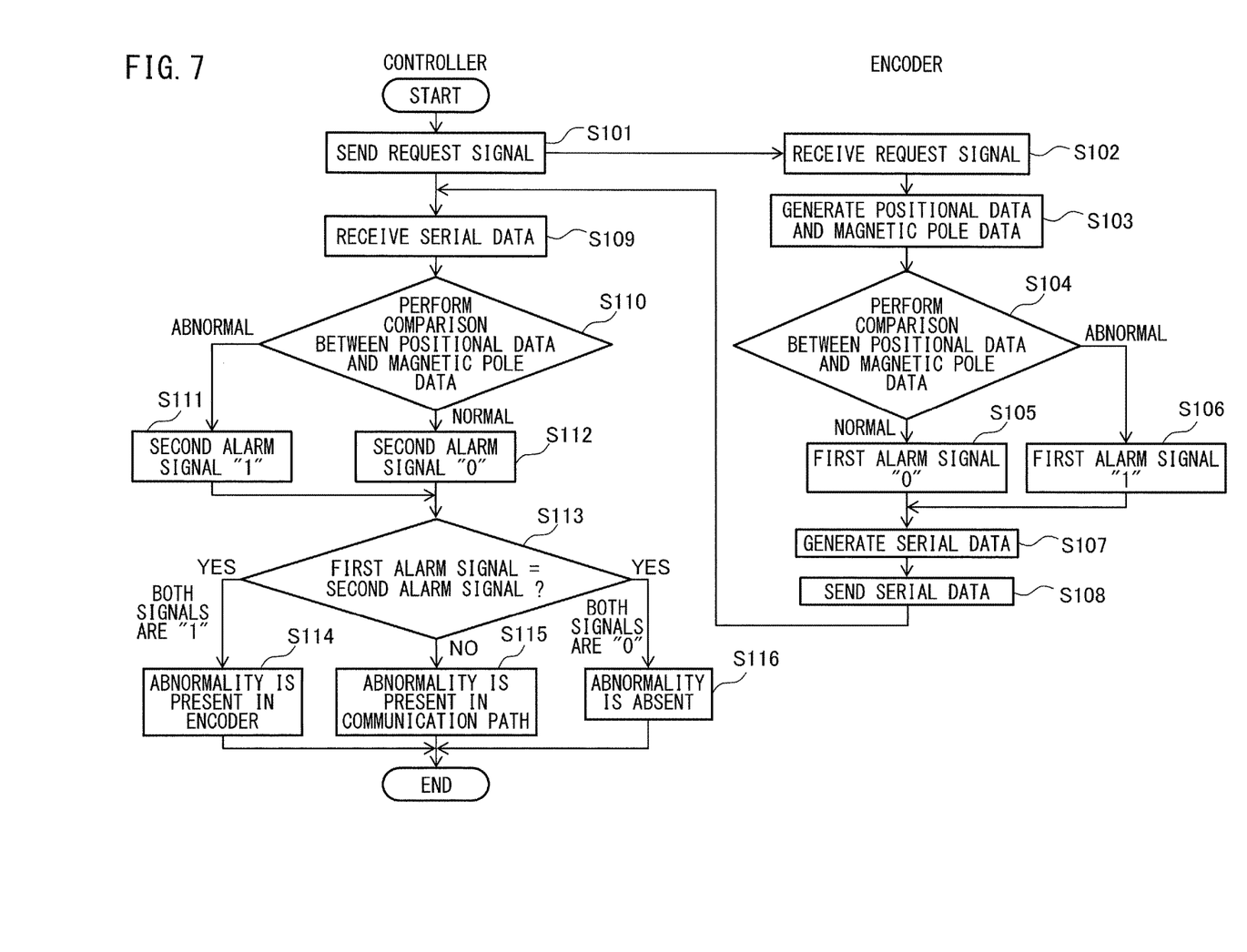
FIG. 7 is a flowchart of a process of a method for detecting an abnormality according to the embodiment.

Next, a method for detecting an abnormality according to this embodiment will be described. FIG. 7 is a flowchart of the process of the method for detecting an abnormality according to the embodiment. The method for detecting an abnormality according to the embodiment uses a system that includes an encoder 1 (see FIG. 2) for outputting positional data and magnetic pole data of an output axis of a motor, and a controller 2 that wiredly or wirelessly communicates with the encoder 1 and receives the positional data and the magnetic pole data outputted from the encoder 1.

First, in step S101, the controller 2 sends a request signal to request the start of an abnormality detection process to the encoder 1. In step S102, the encoder 1 receives the request signal from the controller 2, and starts the abnormality detection process.

Next, in step S103, the encoder 1 generates positional data and magnetic pole data. More specifically, as shown in FIGS. 1 and 2, the positional data generation circuit 11 measures the angle of the output axis 41 of the motor 4, and generates positional data from the measured angle. The magnetic pole data generation circuit 12 generates magnetic pole data representing the position of the rotor of the motor 4.

Next, in steps S104 to S106, the encoder 1 detects the presence or absence of an abnormality based on the positional data and the magnetic pole data, and outputs a first alarm signal indicating whether or not an abnormality has occurred. More specifically, in step S104, the positional data and the magnetic pole data are compared. When the difference between the positional data and the magnetic pole data exceeds a threshold value, it is determined that an abnormality has occurred, and a first alarm signal "1" is outputted in step S106. When the difference between the positional data and the magnetic pole data is equal to or lower than the threshold value, it is determined that no abnormality (a normal state) has occurred, and a first alarm signal "0" is outputted in step S105. The method for determining the presence or absence of an abnormality is described above with reference to FIGS. 3A, 4A, 4B, and 5A.

Next, in step S107, serial data is generated. More specifically, the parallel-to-serial conversion circuit 14 applies parallel-to-serial conversion to the positional data, the magnetic pole data, and the first alarm signal.

Next, in step S108, the generated serial data is sent to the controller 2. The serial data has a configuration as shown in FIG. 6.

Next, in step S109, the controller 2 receives the serial data sent from the encoder 1.

Next, in step S110 to S112, the controller 2 detects the presence or absence of an abnormality based on the positional data and the magnetic pole data received from the encoder 1, and outputs a second alarm signal indicating whether or not an abnormality has occurred. More specifically, the positional data and the magnetic pole data are compared. When the difference between the positional data and the magnetic pole data exceeds a threshold value, it is determined that an abnormality has occurred, and a second alarm signal "1" is outputted in step S111. When the difference between the positional data and the magnetic pole data is equal to or lower than the threshold value, a normal state is determined to have occurred, and a second alarm signal "0" is outputted in step S112. The method for determining the presence or absence of an abnormality is described above with reference to FIGS. 3B, 4A, 4B, and 5B.

Next, in step S113 to S116, the presence or absence of an abnormality in the wiring 3, which is the communication path between the encoder 1 and the controller 2, is detected based on the first alarm signal and the second alarm signal. In step S113, whether or not the first alarm signal and the second alarm signal are equal is determined.

When both of the first alarm signal and the second alarm signal are equally at "1", in step S114, an abnormality is determined to be present in the encoder. In this manner, when both of the first alarm signal and the second alarm signal indicate abnormalities, an abnormality is determined to be present in the encoder 1.

When the first alarm signal and the second alarm signal are not equal, in other words, when the first alarm signal is "1" and the second alarm signal is "0", or when the first alarm signal is "0" and the second alarm signal is "1", in step S115, an abnormality is determined to be present in the communication path. In this manner, when only any one of the first alarm signal and the second alarm signal indicates an abnormality, an abnormality is determined to be present in the communication path.

On the other hand, when both of the first alarm signal and the second alarm signal are equally at "0", in step S116, no abnormality (a normal state) is determined to have occurred in the encoder.

According to the encoder system and the method for detecting an abnormality according to the embodiment, as described above, when at least one of the positional data and the magnetic pole data is abnormal, whether the cause of the abnormality is ascribed to the encoder or the communication between the encoder and the controller can be easily determined.

According to the encoder system having the function of detecting an abnormality and the method for detecting an abnormality according to the embodiment of this disclosure, whether the cause of the occurrence of an abnormality is present in the encoder or in the communication path between the encoder and the controller can be recognized.

What is claimed is:

1. An encoder system comprising:
   an encoder configured to output positional data and magnetic pole data of an output axis of a motor; and
   a controller wiredly or wirelessly communicating with the encoder, configured to receive the positional data and the magnetic pole data outputted from the encoder, wherein
   the encoder includes:
      a positional data generation circuit configured to measure an angle of the output axis of the motor, and generating the positional data from the measured angle;
      a magnetic pole data generation circuit configured to generate the magnetic pole data representing the position of a rotor of the motor;
      a first data abnormality detection circuit configured to detect the presence or absence of an abnormality by comparing the positional data to the magnetic pole data, and output a first alarm signal indicating whether or not an abnormality has occurred; and
      a parallel-to-serial conversion circuit configured to apply parallel-to-serial conversion to the positional data, the magnetic pole data, and the first alarm signal, and output serial data to the controller, and
   the controller includes:
      a second data abnormality detection circuit configured to detect the presence or absence of an abnormality by comparing the positional data to the magnetic pole data received from the encoder, and output a second alarm signal indicating whether or not an abnormality has occurred; and
      a communication abnormality detector configured to detect the presence or absence of an abnormality in a communication path between the encoder and the controller, based on the first alarm signal and the second alarm signal,
      wherein when either the first alarm signal or the second alarm signal indicates an abnormality, the communication abnormality detector determines that an abnormality has occurred in the communication path, and
      wherein when both of the first alarm signal and the second alarm signal indicate abnormalities, the communication abnormality detector determines that an abnormality has occurred in the encoder.

2. The encoder system according to claim 1, wherein the first data abnormality detection circuit and the second data abnormality detection circuit detect abnormalities in the same manner.

3. The encoder system according to claim 1, wherein when the difference between the positional data and the magnetic pole data exceeds a threshold value, the first data abnormality detection circuit and the second data abnormality detection circuit output the first alarm signal and the second alarm signal, respectively.

4. The encoder system according to claim 1, wherein when velocity data $V(n)$ calculated from positional data $P(n)$ detected at the present time and positional data $P(n-1)$ detected at the previous time exceeds a threshold velocity, the first data abnormality detection circuit and the second data abnormality detection circuit output the first alarm signal and the second alarm signal, respectively.

5. The encoder system according to claim 1, wherein when the difference between velocity data $V(n)$ at the present time calculated from positional data $P(n)$ detected at the present time and positional data $P(n-1)$ detected at the previous time and velocity data $V(n-1)$ at the previous time calculated from the positional data $P(n-1)$ detected at the previous time and positional data $P(n-2)$ detected at the second previous time exceeds a threshold velocity, the first data abnormality detection circuit and the second data abnormality detection circuit output the first alarm signal and the second alarm signal, respectively.

6. A method for detecting an abnormality using a system including:
   an encoder configured to output positional data and magnetic pole data of an output axis of a motor; and
   a controller wiredly or wirelessly communicating with the encoder, configured to receive the positional data and the magnetic pole data outputted from the encoder,
   the method comprising:
   by the encoder,
      measuring an angle of the output axis of the motor, and generating the positional data from the measured angle;
      generating the magnetic pole data representing the position of a rotor of the motor;
      detecting the presence or absence of an abnormality by comparing the positional data to the magnetic pole data, and outputting a first alarm signal indicating whether or not an abnormality has occurred; and
      applying parallel-to-serial conversion to the positional data, the magnetic pole data, and the first alarm signal, and outputting serial data to the controller; and
   by the controller,
      detecting the presence or absence of an abnormality by comparing the positional data to the magnetic pole data received from the encoder, and outputting a second alarm signal indicating whether or not an abnormality has occurred; and
      detecting the presence or absence of an abnormality in a communication path between the encoder and the controller, based on the first alarm signal and the second alarm signal,
      wherein when either the first alarm signal or the second alarm signal indicates an abnormality, the communication abnormality detector determines that an abnormality has occurred in the communication path, and
      wherein when both of the first alarm signal and the second alarm signal indicate abnormalities, the communication abnormality detector determines that an abnormality has occurred in the encoder.

7. The method for detecting an abnormality according to claim 6, wherein in the stage of detecting the presence or absence of an abnormality in the communication path between the encoder and the controller, when either the first alarm signal or the second alarm signal indicates an abnormality, an abnormality is determined to have occurred in the communication path.

8. The method for detecting an abnormality according to claim 6, wherein in the stage of detecting the presence or absence of an abnormality in the communication path between the encoder and the controller, when both of the first alarm signal and the second alarm signal indicate abnormalities, an abnormality is determined to have occurred in the encoder.

9. The method for detecting an abnormality according to claim 6, wherein in a stage where the encoder and the controller each detect the presence or absence of abnormalities based on the positional data and the magnetic pole data, the encoder and the controller perform the detection of the abnormalities in the same manner.

10. The method for detecting an abnormality according to claim 6, wherein in a stage where the encoder and the controller each detect the presence or absence of abnormalities based on the positional data and the magnetic pole data, when the difference between the positional data and the magnetic pole data exceeds a threshold value, the encoder and the controller output the first alarm signal and the second alarm signal, respectively.

11. The method for detecting an abnormality according to claim 6, wherein in a stage where the encoder and the controller each detect the presence or absence of abnormalities based on the positional data and the magnetic pole data, when velocity data V(n) calculated from positional data P(n) detected at the present time and positional data P(n−1) detected at the previous time exceeds a threshold velocity, the encoder and the controller output the first alarm signal and the second alarm signal, respectively.

12. The method for detecting an abnormality according to claim 6, wherein in a stage where the encoder and the controller each detect the presence or absence of abnormalities based on the positional data and the magnetic pole data, when the difference between velocity data V(n) at the present time calculated from positional data P(n) detected at the present time and positional data P(n−1) detected at the previous time and velocity data V(n−1) at the previous time calculated from the positional data P(n−1) detected at the previous time and positional data P(n−2) detected at the second previous time exceeds a threshold velocity, the encoder and the controller output the first alarm signal and the second alarm signal, respectively.

13. An encoder system comprising:
an encoder configured to output positional data and magnetic pole data of an output axis of a motor; and
a controller wiredly or wirelessly communicating with the encoder, configured to receive the positional data and the magnetic pole data outputted from the encoder, wherein
the encoder includes:
    a positional data generation circuit configured to measure an angle of the output axis of the motor, and generating the positional data from the measured angle;
    a magnetic pole data generation circuit configured to generate the magnetic pole data representing the position of a rotor of the motor;
    a first data abnormality detection circuit configured to detect the presence or absence of an abnormality by comparing the positional data to the magnetic pole data, and output a first alarm signal indicating whether or not an abnormality has occurred; and
    a parallel-to-serial conversion circuit configured to apply parallel-to-serial conversion to the positional data, the magnetic pole data, and the first alarm signal, and output serial data to the controller, and
the controller includes:
    a second data abnormality detection circuit configured to detect the presence or absence of an abnormality by comparing the positional data to the magnetic pole data received from the encoder, and output a second alarm signal indicating whether or not an abnormality has occurred; and
    a communication abnormality detector configured to detect the presence or absence of an abnormality in a communication path between the encoder and the controller and the presence or absence of an abnormality in the encoder, based on the first alarm signal and the second alarm signal.

\* \* \* \* \*